United States Patent
Mensch et al.

(10) Patent No.: US 10,372,932 B2
(45) Date of Patent: *Aug. 6, 2019

(54) SECURE FACTORY DATA GENERATION AND RESTORATION

(71) Applicant: Apple Inc., Cupertino, CA (US)

(72) Inventors: Thomas P. Mensch, Cupertino, CA (US); Jason D. Gosnell, San Francisco, CA (US); Jerrold V. Hauck, Windermere, FL (US); Muralidhar S. Vempaty, San Jose, CA (US); Dallas B. De Atley, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,765

(22) Filed: Jan. 6, 2017

(65) Prior Publication Data

US 2017/0185794 A1    Jun. 29, 2017

Related U.S. Application Data

(63) Continuation of application No. 14/207,361, filed on Mar. 12, 2014, now Pat. No. 9,542,558.

(51) Int. Cl.
   *G06F 21/57*   (2013.01)
   *G06F 21/62*   (2013.01)
   (Continued)

(52) U.S. Cl.
   CPC .......... *G06F 21/6218* (2013.01); *G06F 21/57* (2013.01); *G06F 21/572* (2013.01);
   (Continued)

(58) Field of Classification Search
   CPC ...... G06F 21/602; G06F 21/57; G06F 21/577; G06F 21/572; H04L 63/0428
   See application file for complete search history.

(56) References Cited

U.S. PATENT DOCUMENTS

| 7,660,998 | B2 | 2/2010 | Walmsley |
| 7,953,980 | B2 | 5/2011 | Schluessler |

(Continued)

FOREIGN PATENT DOCUMENTS

EP    2337299 A1    6/2011

OTHER PUBLICATIONS

Men Long et al., "Energy-Efficient and Intrusion-Resilient Authentication for Ubiquitous Access to Factory Floor Information", IEEE Transactions on Industrial Informatics, vol. 2, No. 1, Feb. 2006, pp. 40-47.

*Primary Examiner* — Joseph P Hirl
*Assistant Examiner* — Stephen T Gundry
(74) *Attorney, Agent, or Firm* — Womble Bond Dickinson (US) LLP

(57) ABSTRACT

In various embodiments, methods, devices and systems for securely generating, sealing, and restoring factory-generated calibration and provisioning data for an electronic device are described, in which calibration and provisioning data for an electronic device are generated in a distributed manner and stored on a storage system. The calibration data can be retrieved from the storage system during device assembly and finalized calibration and provisioning data for each electronic device can be stored to the storage system. In one embodiment, a sealing server, to attest to the authenticity of the factory generated data, seals the finalized calibration data. In one embodiment, an electronic device can access a data store containing the factory-generated data and can update or restore calibration or provisioning data for the device from the data store.

31 Claims, 11 Drawing Sheets

(51) Int. Cl.
*G06F 21/60* (2013.01)
*H04L 9/32* (2006.01)
*H04L 29/06* (2006.01)

(52) U.S. Cl.
CPC .......... *G06F 21/602* (2013.01); *H04L 9/3247* (2013.01); *H04L 63/083* (2013.01); *H04L 63/0876* (2013.01); *G06F 21/577* (2013.01); *H04L 63/0428* (2013.01)

(56) References Cited

U.S. PATENT DOCUMENTS

| | | | | |
|---|---|---|---|---|
| 8,589,667 | B2* | 11/2013 | Mujtaba | G06F 21/57 713/1 |
| 8,682,308 | B2 | 3/2014 | De Atley | |
| 8,732,812 | B2* | 5/2014 | Chopart | G06F 21/31 705/13 |
| 8,843,764 | B2* | 9/2014 | Hussain | G06F 21/10 713/189 |
| 9,100,174 | B2* | 8/2015 | Hartley | H04L 9/0866 |
| 9,135,430 | B2* | 9/2015 | Callaghan | G06F 21/33 |
| 9,292,314 | B2* | 3/2016 | Adams | G06F 21/53 |
| 9,323,950 | B2* | 4/2016 | Maletsky | G06F 21/57 |
| 9,329,844 | B2 | 5/2016 | Lattner | |
| 9,380,040 | B1* | 6/2016 | Aplemakh | H04L 47/824 |
| 9,436,848 | B2* | 9/2016 | Beitel | G06F 21/76 |
| 9,497,221 | B2* | 11/2016 | Stern | H04L 63/20 |
| 9,542,558 | B2* | 1/2017 | Mensch | G06F 21/57 |
| 9,635,014 | B2* | 4/2017 | Venkataraman | H04L 63/0823 |
| 9,819,661 | B2* | 11/2017 | Stern | H04L 63/06 |
| 9,843,585 | B2* | 12/2017 | Haggerty | H04L 63/0853 |
| 2002/0095587 | A1* | 7/2002 | Doyle | G06Q 20/341 713/186 |
| 2006/0009235 | A1 | 1/2006 | Sheynblat | |
| 2006/0101286 | A1* | 5/2006 | Catherman | G06F 21/57 713/193 |
| 2006/0236111 | A1* | 10/2006 | Bodensjo | G06F 12/1466 713/176 |
| 2007/0061897 | A1 | 3/2007 | Holtzman | |
| 2007/0073416 | A1* | 3/2007 | Grawrock | G06F 21/57 700/1 |
| 2007/0082699 | A1 | 4/2007 | Karaoguz | |
| 2007/0266289 | A1 | 11/2007 | Yang | |
| 2008/0148360 | A1 | 6/2008 | Karstens | |
| 2008/0148409 | A1* | 6/2008 | Ampunan | G06F 21/57 726/26 |
| 2008/0256363 | A1 | 10/2008 | Balacheff | |
| 2009/0181662 | A1 | 7/2009 | Fleischman | |
| 2009/0197640 | A1 | 8/2009 | Fa et al. | |
| 2009/0212813 | A1* | 8/2009 | Hu | G06F 21/73 326/8 |
| 2009/0247124 | A1 | 10/2009 | De Atley et al. | |
| 2009/0249064 | A1 | 10/2009 | De Atley | |
| 2009/0254753 | A1 | 10/2009 | De Atley et al. | |
| 2010/0023778 | A1 | 1/2010 | Hauck | |
| 2010/0222081 | A1 | 9/2010 | Ward | |
| 2010/0312966 | A1* | 12/2010 | De Atley | G06F 21/53 711/118 |
| 2010/0318310 | A1* | 12/2010 | Thomas | H01L 22/20 702/107 |
| 2011/0007901 | A1 | 1/2011 | Ikeda | |
| 2011/0010699 | A1* | 1/2011 | Cooper | G06F 21/12 717/169 |
| 2011/0138377 | A1 | 6/2011 | Allen | |
| 2011/0195699 | A1 | 8/2011 | Tadayon | |
| 2011/0258426 | A1* | 10/2011 | Mujtaba | G06F 21/57 713/2 |
| 2012/0054734 | A1 | 3/2012 | Andrews | |
| 2012/0309348 | A1 | 12/2012 | De Atley | |
| 2012/0309377 | A1 | 12/2012 | De Atley | |
| 2013/0159717 | A1 | 6/2013 | Rabadi | |
| 2013/0185548 | A1* | 7/2013 | Djabarov | H04L 41/082 713/2 |
| 2013/0227703 | A1 | 8/2013 | Sotos | |
| 2013/0318343 | A1* | 11/2013 | Bjarnason | H04L 41/0809 713/157 |
| 2014/0019364 | A1* | 1/2014 | Hurry | G06F 21/33 705/67 |
| 2014/0044265 | A1* | 2/2014 | Kocher | H04L 9/083 380/277 |
| 2014/0064480 | A1* | 3/2014 | Hartley | H04L 9/0866 380/30 |
| 2014/0068246 | A1* | 3/2014 | Hartley | G09C 1/00 713/155 |
| 2014/0075567 | A1* | 3/2014 | Raleigh | H04W 12/10 726/26 |
| 2014/0075579 | A1* | 3/2014 | Baltes | G06F 8/61 726/30 |
| 2014/0085507 | A1 | 3/2014 | Pillman | |
| 2014/0119232 | A1 | 5/2014 | Gurewitz | |
| 2014/0122897 | A1* | 5/2014 | Dodeja | G06F 21/00 713/189 |
| 2014/0130034 | A1* | 5/2014 | Subbu | G06F 8/665 717/172 |
| 2014/0164779 | A1* | 6/2014 | Hartley | H04L 9/0866 713/176 |
| 2014/0201518 | A1* | 7/2014 | Yao | H04L 63/062 713/155 |
| 2014/0205092 | A1* | 7/2014 | Hartley | H04L 9/0866 380/44 |
| 2014/0250215 | A1* | 9/2014 | Bowen | G06F 21/57 709/223 |
| 2014/0260518 | A1 | 9/2014 | Swar et al. | |
| 2014/0281500 | A1* | 9/2014 | Ignatchenko | H04L 9/3263 713/156 |
| 2014/0317417 | A1* | 10/2014 | Ashkenazi | H04L 9/0866 713/189 |
| 2014/0359755 | A1* | 12/2014 | Beitel | G06F 21/572 726/18 |
| 2015/0072726 | A1* | 3/2015 | Stern | H04W 88/06 455/552.1 |
| 2015/0074745 | A1* | 3/2015 | Stern | H04L 63/20 726/1 |
| 2015/0074764 | A1* | 3/2015 | Stern | H04L 63/06 726/4 |
| 2015/0095648 | A1* | 4/2015 | Nix | H04W 4/70 713/170 |
| 2015/0101038 | A1 | 4/2015 | Hong | |
| 2015/0106616 | A1* | 4/2015 | Nix | H04W 4/70 713/156 |
| 2015/0170145 | A1* | 6/2015 | Patel | G06F 8/20 705/44 |
| 2015/0172054 | A1* | 6/2015 | Prakash | G06F 21/44 713/189 |
| 2015/0199522 | A1* | 7/2015 | Wentz | G06F 21/10 726/26 |
| 2015/0200934 | A1* | 7/2015 | Naguib | G06F 21/575 713/2 |
| 2015/0237502 | A1* | 8/2015 | Schmidt | H04W 12/10 726/7 |
| 2015/0244711 | A1* | 8/2015 | Venkataraman | H04L 63/0823 713/156 |
| 2015/0261966 | A1* | 9/2015 | Mensch | G06F 21/57 713/189 |
| 2015/0304736 | A1* | 10/2015 | Lal | G06F 21/10 380/210 |
| 2016/0007198 | A1* | 1/2016 | Lacey | H04W 4/50 713/156 |
| 2016/0028722 | A1* | 1/2016 | Kocher | H04L 9/083 713/156 |
| 2016/0227412 | A1 | 8/2016 | Li | |
| 2017/0039372 | A1* | 2/2017 | Koval | G01D 4/004 |

* cited by examiner

SECURE FACTORY DATA GENERATION AND RESTORATION

This application is a continuation of co-pending U.S. application Ser. No. 14/207,361 filed on Mar. 12, 2014.

BACKGROUND OF THE DISCLOSURE

An electronic computing device, such as a smartphone or tablet computer, is assembled from a variety of individual electronic components, each of which are tested during manufacturing. During testing, the components must function within an acceptable performance range to be considered a passing component. However, even among passing components, there may still be some variation in the quality of the component output, as long as the variation is within acceptable tolerance. To compensate for the variation within the acceptable tolerances, the collection of performance data that is gathered during component testing is used to adjust the output or input or both input and output of the components during the operation of the electronic device.

Once a complete electronic computing device is assembled from the individual components, the device undergoes additional testing, and additional calibration data is gathered and used to correct for errors created by signal variances due to the combined tolerances of the many components within the assembled electronic device. For example the gain of the antennas of the wireless communication interface of a device is set or adjusted, internal voltage references are programmed, audio volumes are calibrated, and the display contrast is configured to a suitable default level. Additionally, if a device is to access a particular wireless communication network, such as a mobile phone radio network, the device is provisioned to communicate over the network, and the wireless radio system is configured and calibrated, as proper radio frequency calibration for the wireless baseband processor is essential for ensuring that each device meets the regulatory requirements prescribed by the various communications regulatory agencies. Moreover, any sensors, such as accelerometers, gyroscopes, or magnetometers that are contained within the electronic device are calibrated when manufacturing the individual components, during device manufacturing, or both.

In some devices the calibration and provisioning data is stored within dedicated nonvolatile memory devices, such as serial NOR flash EEPROM devices that are integrated within the components of the device. The dedicated storage devices within the components allow the components' manufactures to store calibration data generated during the manufacturing process. The dedicated storage devices (within the component) also provide a manner of physical security for the calibration and provisioning data, as the dedicated memory devices storing the calibration and provisioning information are only accessible using specialized equipment and access methods, which renders the factory data essentially inaccessible outside of the factory environment.

However, the added expense of the dedicated memory within each component increases the manufacturing cost, which will be reflected either at the component manufacturing level, the device manufacturing level, or both. Additionally, it may not be cost effective to include sufficient dedicated nonvolatile memory to store the desired amount of calibration data, either for the individual component or for the assembled device. Accordingly, the currently available calibration and device provisioning data must be small enough to occupy the limited amount of dedicated nonvolatile memory assigned to store the calibration and provisioning data for the component.

SUMMARY OF THE DESCRIPTION

Device manufacturers can avoid the problems inherent in the use of dedicated storage devices by storing the factory-generated data on the primary storage device instead of dedicated memory devices coupled to each module. Described herein are methods, devices and systems for securely generating, sealing, and restoring factory-generated calibration and provisioning data for an electronic device. References to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a factory data service for generating, storing, and distributing calibration and provisioning data for a family of electronic devices comprises a first factory server, such as a module integration factory server, coupled to a storage system such as a distributed storage network. The first factory server is configured to store calibration data that is generated for one or more modules of an electronic device of the family of electronic devices. The calibration data can be associated with the one or more modules via a module identifier that is unique to each of the modules. In one embodiment, the first factory server is configured to transmit the calibration data to the storage system.

An embodiment of the system can include a second factory server, such as a server in a contract manufacturer facility. The second factory server is coupled to the storage system and is configured to retrieve the calibration data associated with the one or more modules from the storage system. The second factory server can also be configured to assemble a set of factory data for the electronic device, in one embodiment, the set of factory data is assembled from the calibration data that was previously stored by the first factory server. The factory data can be associated with the electronic device via a device identifier that is unique to the electronic device.

In one embodiment, the system can additionally include a sealing server coupled to the storage system. The sealing server can be configured to, in response to a request from the electronic device, authenticate the set of factory data for the electronic device using the module identifier of each module along with various trust verification signatures. Once authenticated, the signature server is configured to create a cryptographic association between the set of factory data and the electronic device. In one embodiment, a manifest of the cryptographic association is stored on the electronic device, as well as the storage of the factory data service or in other storage systems.

In one embodiment, the first factory server, the second factory server and the sealing server can be one, two, or three or more different computer systems. For example, in the case where all three servers are implemented as a single computer system, a first software component executing on the single system provides the functionality and operations of the first factory server, a second software component executing on the single system provides the functionality and operations of the second factory server, and a third software component executing on the single computer system provides the functionality and operations of the sealing server. In one embodiment of the case where all three servers are implemented as a single computer system, the different software components can be different portions of one or more computer program. Other features will be apparent from the accompanying drawings and from the detailed description, which follows. For example, disclosed herein is a method of authenticating factory-generated data for an electronic device, the method comprising receiving a request to cryptographically sign a set of factory-generated data associated with a set of hardware modules of the electronic device. The request includes a certificate of the electronic device and is signed with a cryptographic signature of the electronic device. The method additionally comprises the verification of the authenticity of the signature of the request. When the request is authentic, the method additionally includes verifying each element within the set of factory-generated data. Once successfully authenticated, an embodiment further includes cryptographically signing the set of factory data when each element in the set of factory-generated data is verified. Also disclosed is an electronic device suitable for use by embodiments of the above system and method. The electronic device can include a storage module to store factory-generated data, at least one electronic module having factory-generated data stored on the storage module, the factory-generated data including calibration or provisioning data for the at least one electronic module, and one or more processors having one or more processor cores.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Figure 1B:
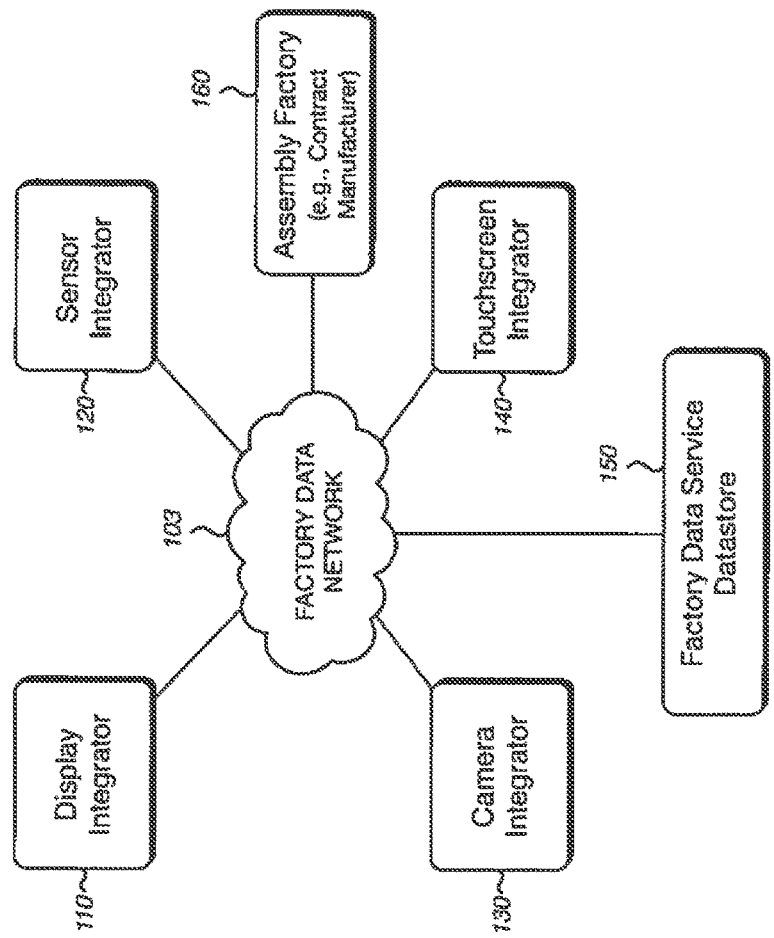
FIGS. 1A and 1B show block, diagrams illustrating an embodiment of a networked system used to generate, index, and store factory-generated calibration data for component modules for electronic device for retrieval during device assembly.

The systems and methods disclosed, in various embodiments, provide a secure method of generating, storing, tracking, and deploying factory-generated calibration and provisioning data within a factory environment. Also disclosed is a method for updating factory data stored on a device once the device has left the factory, including a method for authorized agents of the manufacturer to re-certify the authenticity and validity of the factory data outside of the factory environment. In the following description, additional detail is shown in some instances that not intended to be limiting upon the embodiments. In other instances, well-known circuits, structures, and techniques axe omitted to avoid obscuring the understanding of this description.

In one embodiment, factory test stations are authenticated with a factory data service. The test stations generate factory data and store the generated data on a storage system, which can be a distributed storage system or other storage system provided by the factory data service. The generated data is retrieved during device assembly and stored to the primary storage of the electronic device. The factory data is verified and authenticated by the factory data service and the device manufacturer applies a cryptographic seal to the data.

This signature allows the device to verify the authenticity of the factory data during an update, and allows the device to determine if any aspect of the factory-generated data has become damaged or corrupted. For certain authorized agents of the manufacturer, a "re-sealing" process is available following the field replacement of calibrated components. The re-sealing process allows an authorized agent to attest to the authenticity of the new set of factory-generated calibration data that includes the calibration data for the replacement component.

Storing the factory data on the primary storage of the device enables the use of a significantly larger set of calibration data for each component. The additional sensor calibration data can be used to enhance the sensor precision of high-end electronic devices. Alternatively, the manufacturing costs for low end devices can be further reduced by enabling a more robust set of calibrations, which can be used to compensate for the wider tolerances found in less expensive components. The components in a device can include various input or output hardware modules of the device including, for example, one or more radios, a display device, a touch screen sensor, and ambient light sensor, a proximity sensor, one or more cameras, one or more microphones, etc.

Generating the Factory Data

Factory data is generated during the various stages of manufacturing. During the module integration stage, a module integrator manufactures the various components that make up the assembled electronic device. During this stage, the module integrator can generate some of the module specific calibration data for certain individual components (e.g., displays and sensors). The calibration data for each module is associated with the module using a unique identifier. The calibration data, including the module identifier (module ID), can then be transmitted to one or more storage systems such as a cloud-based distributed storage system used by the factory data service.

At the device assembly phase, a contract manufacturer can retrieve the calibration data from the factory data service cloud. In one embodiment, the data for each module is retrieved by reference to the unique module ID. Once the data is retrieved, the integrity of the data can be verified to determine that the data has not been corrupted during storage or transport, or that the data has not be recalled by the module integrator due to an error discovered within the calibration data. As the device is assembled, additional device level calibration and provisioning data can be generated. For example, RF (Radio Frequency) calibration data is generated for devices with radio frequency transceivers that are used during wireless communication. Once the device is assembled and operational, device specific provisioning data is generated to enable the device to communicate on one or more wireless radio networks. At the end of the manufacturing process, the device has a set of factory-generated calibration and provisioning data that is unique to the device, and that is associated with the device via a device specific identifier.

Figure 1A:
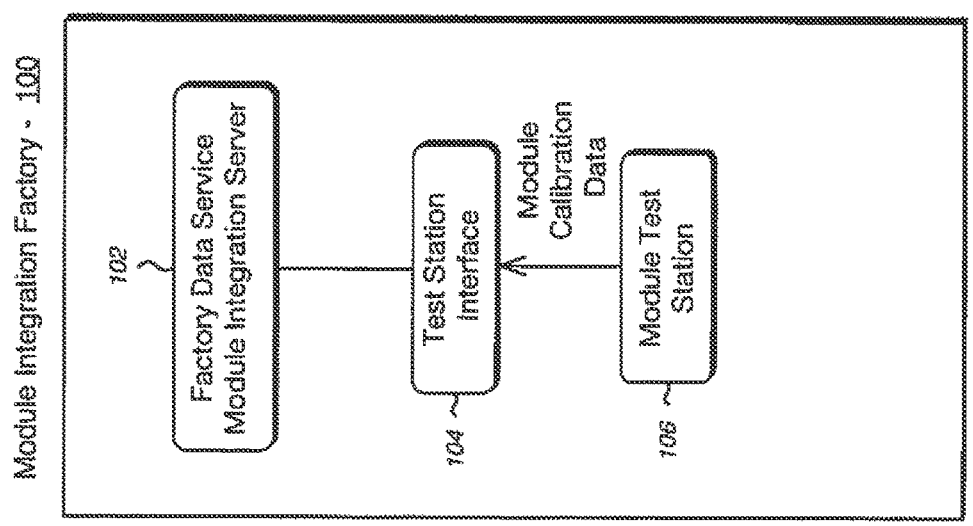

FIGS. 1A and 1B show block diagrams illustrating an embodiment of a networked system used to generate, index, and store factory-generated calibration data for component modules for electronic device for retrieval during device assembly. As shown in FIG. 1A, a module integration factory 100 can be supplied with at least one module test station 106, which couples to a factory data service module integration server 102 via a test station interface 104. The module test station 106 is to test specific modules or components designed for integration into the electronic device. For example, the module can be a touch screen component or display component of a mobile digital device, such as the iPhone® from Apple Inc. of Cupertino, Calif. The module test station 106 generates module specific calibration data and stores the data on a factory data service module integration server 102. In one embodiment, the calibration data is associated with the modules via a module ID that is unique to each of the modules, and the data is indexed on the module integration server based on the module, ID, such that the calibration data for each module can be referenced and retrieved after storage.

In one embodiment, a test station interface 104 is used to provide a secure data link between the module test station 106 and the module integration server 102. The test station interface 104 is an apparatus that facilitates the authentication of the module test station 106 with the factory data service module integration server 102. The test station interface 104 can be employed in system configurations where the factory data service system servers and network are provided by an electronic device design or manufacturing entity that is separate from the module integration entity that has been tasked or contracted to design modules for the electronic device. In other words, the factory data service module integration server 102 and the module test station 106 can be within separate data security domains that are managed by separate entities. For example, a design entity can provide a test station interface 104 to the module integration factory 100 to enable a module test station 106 owned and operated by the module integrator to securely access the factory data service module integration server 102 that is owned and operated by the design entity, and subsequently provide the factory data service to a contract manufacturer to enable the contract manufacturer to securely access the calibration data generated by the module integrator. Alternatively, an original design manufacturer (ODM) that designs and manufactures electronic devices can provide a factory data service system to the various module integrators it has contracted to provide components for an electronic device that the ODM will manufacture.

The module test station 106 and test station interface 104 can communicate over an encrypted communication link (via e.g., SSL, TLS, etc.) with the module integration server 102. In one embodiment, the test stations are configured to perform server certificate checking, to verify that the various test stations are in communication with the authentic factory data service. In one embodiment, the test stations are configured to use randomly generated X.509 digital certificates to establish and maintain encrypted communication channels with the factory data service. Once a secure connection is established, the module test station 106 is authenticated with the factory data service. In one embodiment, the authentication is performed using a variant of the hash based message authentication code (HMAC) algorithm.

In one embodiment, each module test station 106 and test station interface 104 are provided client certificates that are certified by a site-specific certificate authority (CA). The certificates are associated with cryptographic keys that are certified as being associated with the module test station 106 and test station interface 104. Additionally, each module test station 106 can have a client identifier, which is a unique string identifying the client. In various embodiments, the client identifier is a Media Access Control (MAC) address of the module test station 106. Accordingly, the factory data generated by each module test station 106 can be traced to the station that generates the data. In one embodiment, each binary blob of factory calibration data generated by a module test station 106 is also signed using the certified key.

An embodiment of the factory data system allows data generated by a specific test station associated with a specific key to be invalidated via a certificate revocation system. Should a set of data associated with a set of modules, or a set of test stations be found defective, the certificates of the associated test stations can be revoked, and the factory data system can mark the generated data invalid. This enables a manufacturer to correct defective factory-generated calibration data after a device has been assembled and shipped from the factory. In one embodiment, an electronic device that has been purchased and placed into service by an end user can have specific portions of calibration data invalidated, and the device can retrieve the updated calibration data from the server.

In one embodiment, the module integration server 102 for the module integration factory 100 is coupled to a distributed storage network, which is used to store calibration data generated for each of the calibrated modules of the electronic device. FIG. 1B shows an exemplary illustration of multiple module integrators coupled to a factory data network 103. In one embodiment, the various module integration factories include at least one module integration server, such as the module integration server 102 of module integration factory 100. For example, a display integrator 110, sensor integrator 120, camera integrator 130, and touch-screen integrator 140 each include at least one factory data service module integration server coupled to the factory data network 103. In one embodiment, the factory data network 103 provides access to a distributed storage system that includes at least one factory data service data store 150. The factory data service data store 150 can include, or be a component of a distributed storage system for storing indexed factory data for the various components used to assemble the electronic device.

In one embodiment, the system includes an assembly factory 160 having multiple manufacturing servers that are coupled to the factory data service data store 150 via the factory data network 103. The illustrated assembly factory 160 can represent a contract manufacturer that is contracted by the designer of the electronic device, or an original design manufacturer (ODM) that designs and manufactures the electronic device. The servers located within the assembly factory 160 retrieve the calibration data from the factory data service data store 150 for use during the assembly of the electronic device. The factory data for each module is indexed via the unique module ID, allowing the data for each individual module to be retrieved as the module is installed in an electronic device. Once the device is assembled, additional calibration data can be performed in the assembly factory 160. The device calibration data can also be stored in the factory data service data store 150 and indexed based on a unique identifier associated with each electronic device.

Figure 2:
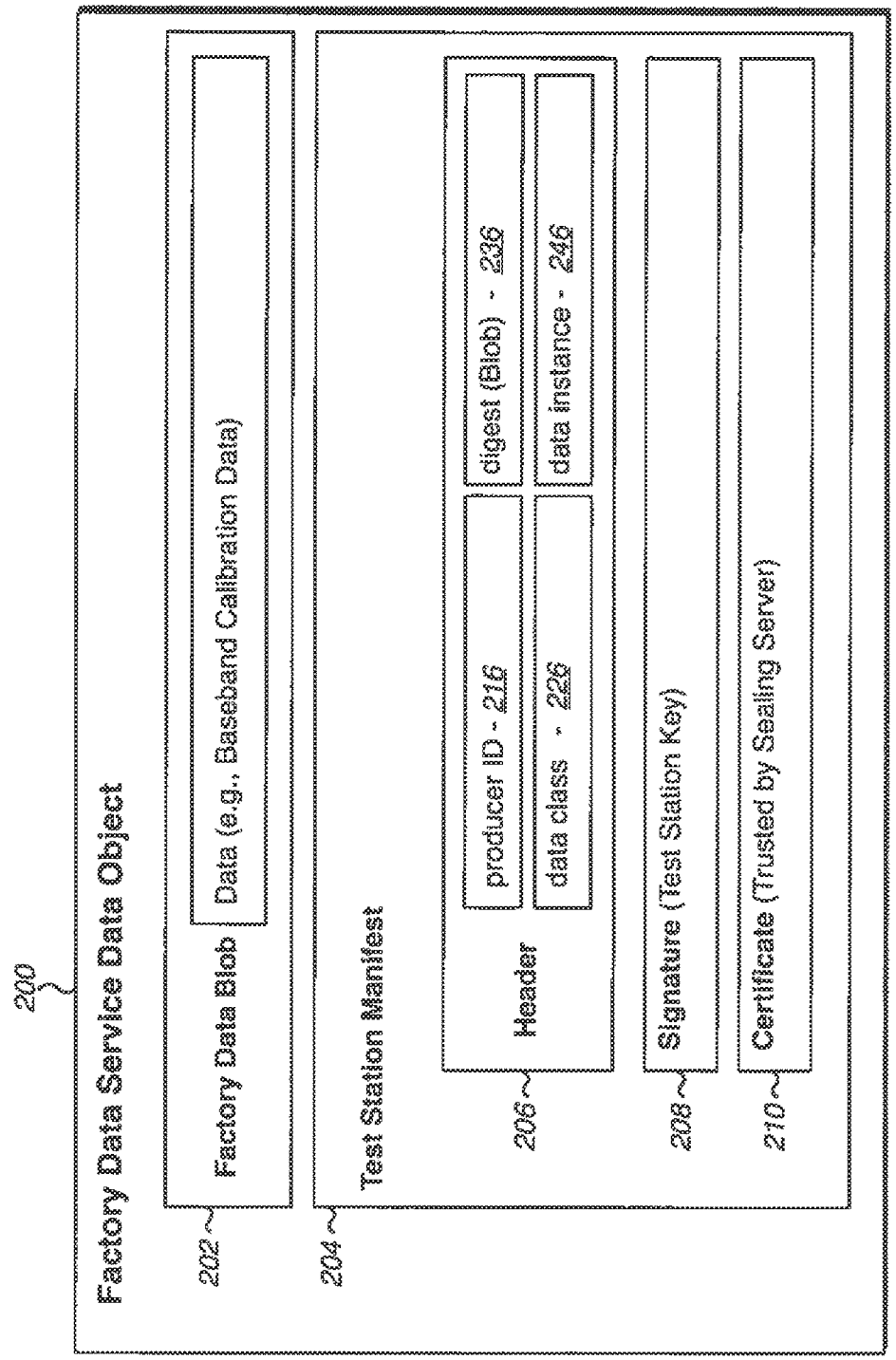
FIG. 2 shows a block diagram illustrating one embodiment of an encapsulated secure factory data objects.

FIG. 2 shows a block diagram illustrating one embodiment of an encapsulated secure factory data objects. The exemplary factory data service data object 200 contains factory-generated data, such as baseband radio processor calibration data, in a factory data blob 202. The factory data service data object also includes a test station manifest 204 containing identifying and certifying data for the factory data blob 202 and the test station that generated the data blob (e.g., module test station 106 of FIG. 1). In one embodiment, the test station manifest 204 includes a header 206 that includes structured data including a producer ID 216 of the module integrator, a data class 226 identifying a classification of the data object, a blob digest 236 of the factory data blob, and a data instance 246, which is a tag that identifies the particular instance of factory data. In one embodiment, the blob digest 236 is a cryptographic hash computed using a message digest algorithm (e.g., MD5), and the data instance 246 is the unique ID of the module associated with the factory data blob. In one embodiment, each test station inserts a signature 208 into each factory data service data object 200, or otherwise signs the data server object with a test station key. The test station key can be certified using an additionally attached certificate 210, which is issued by a site CA, and has trust chain which is rooted at the factory data service root key. The sealing server trusts the certificate 210. In one embodiment, if a factory data blob that is not trusted by the sealing server is included in a set of factory data, the sealing server will refuse to seal the factory data set, and the electronic device will not accept the factory data set. Additional detail regarding the sealing process is discussed below in relation to FIG. 3 and FIG. 7.

In one embodiment, the factory data discussed in FIG. 2 is packaged and encoded as a structured data object before being stored to the factory data service. For example, the factory data can be encoded according to the Abstract Syntax Notation One (ASN.1) standard using any of the compliant encoding rules, such as Basic Encoding Rules (BER) or Distinguished Encoding Rules (DER).

Figure 3:
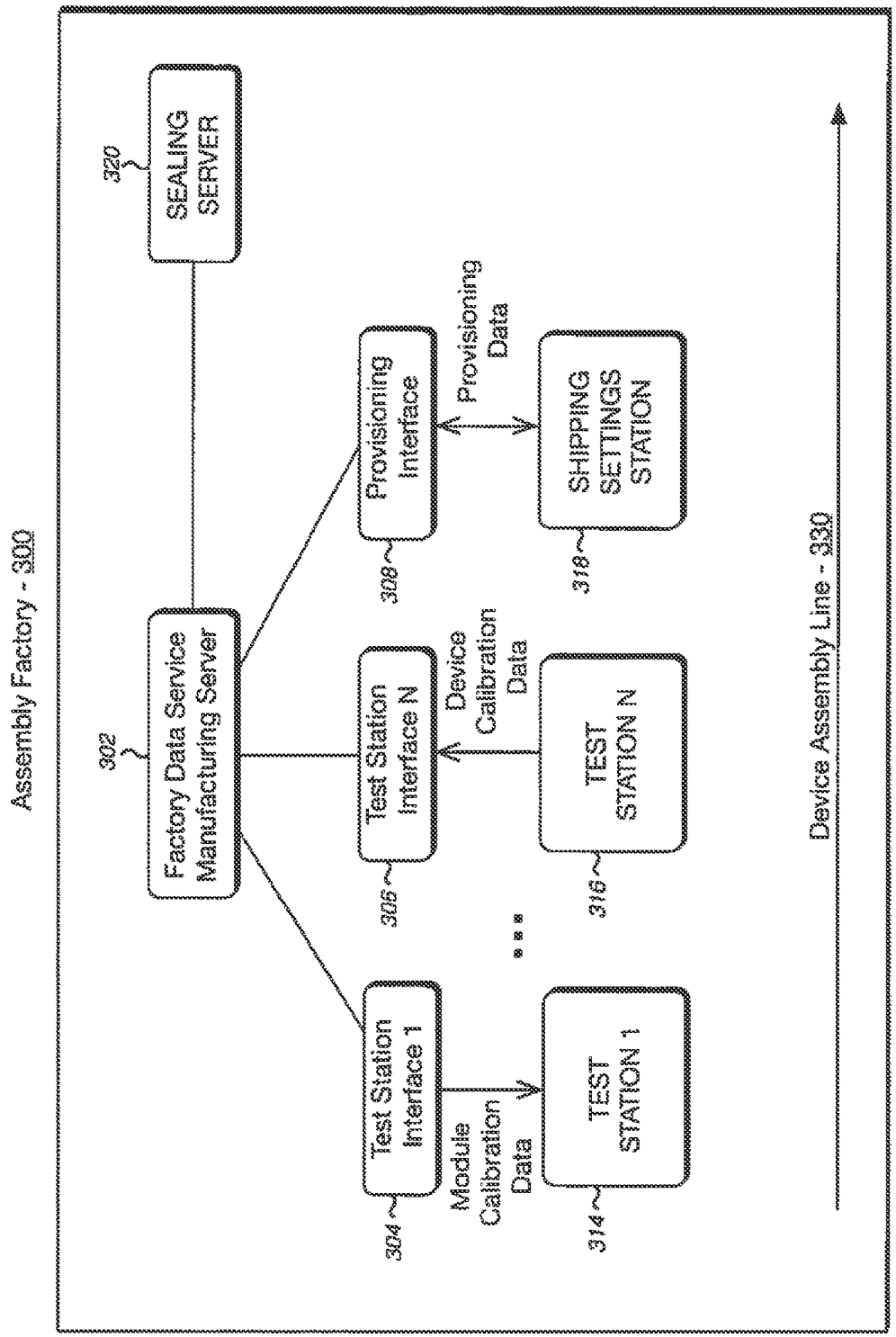
FIG. 3 shows a block diagram illustrating one embodiment of a factory data server network used in an assembly factory for an electronic device.

FIG. 3 shows a block diagram illustrating one embodiment of a factory data server network that is used in an assembly factory for an electronic device. The assembly factory 300 can be the assembly factory 160 of FIG. 1B, such as a contract manufacturing factory or an ODM factory.

The assembly factory 300 is used to assemble an electronic device from the various component and modules manufactured various the module integrators, some of which have submitted factory data, such as module calibration data, to the factory data service. The factory data service system can provide a manufacturing server 302, which is coupled to multiple test and configuration stations (e.g., 314, 316, 318), as well as at least one sealing server 320 that is used to authenticate, verify and seal the factory data set. In one embodiment, as an electronic device moves along a factory assembly line 330 from test station to test station, various components are added to the device. When possible (e.g., during assembly, or after assembly and initial power on), each component is tested. During the assembly and testing, the appropriate calibration data for the modules included in a particular electronic device are retrieved from the factory data service.

As illustrated, a partially assembled electronic device, after having a particular module attached (e.g., camera, sensor, etc.), can arrive at an assembly test station (e.g., first test station 314) for calibration and testing. In one embodiment, the first test station 314 is coupled with the factory data service via a first test station interface 304, which facilitates access to the factory data service for the test station. Once the first test station 314 is authenticated to access the factory data service, the test station retrieves the calibration data for the particular module. In one embodiment, the calibration data is retrieved via a manufacturing server 302 provided by the factory data service, which has access to the distributed storage of the factory data service data store 150 illustrated in FIG. 1B. The first test station 314 can determine the unique ID of the particular module and request the calibration data for the module.

For example, the main circuit board for the electronic device (e.g., motherboard) can include a camera module to provide image and video capture functionality to the electronic device. The test station can read, or otherwise determine the module ID of the camera module and send a request to the factory data service that includes the module ID as the factory data instance, and the camera calibration data as the factory data class. The calibration data for the camera can then be used to calibrate and test the camera module, and the camera module's integration with the electronic device motherboard. Any number of additional test stations can be employed for any number of additional modules for the electronic device. In one embodiment, an Nth test station, 316, which can be an ultimate, or penultimate test station, couples with the factory data service via an Nth test station interface 306. The Nth test station 316 can perform final device testing for the electronic device, before providing final calibration data to the factory data service. The set of final calibration data can include adjusted calibration data for one or more modules within the electronic device, and can additionally include device-wide calibration data for the device as a whole. The Nth (e.g., final) test station 316 packages the final calibration data for the device via a collection of factory data service objects such as the factory data service data object 200 of FIG. 2, and sign the collection of factory data using a test station key that is certified as trusted by the site CA. In one embodiment, the final calibration data collection is indexed using the unique device identifier (device ID) of the mobile device.

The assembled device can then proceed to a shipping settings station 318 where the device's final settings are installed and final configuration tasks are performed. For example, a shipping, customer-facing operating system can be installed on the electronic device to replace any previously installed factory or test operating systems, and voice and data network provisioning data can be provided to the electronic device. The shipping settings station 318 can install software and data to the assembled electronic device and store at least a portion of that data to the factory data service via a provisioning interface 308 to the factory data service manufacturing server 302. The provisioning interface 308 provides authenticated and secure access to the manufacturing server 302 in a similar manner to that provided by the test station interfaces (e.g., 104, 304, 306). The network provisioning data includes commands, settings, and configuration information required to enable the electronic device to provide voice and data communications. Additionally, security provisioning data can be provided to the device, including certificates and passkeys used by the device to access secure services. In one embodiment, the device can be fully activated at the shipping settings station 318 for ultimate diversion to an outgoing quality control station for additional testing, such as cellular radio call testing. Additional information on factory provisioning and activation for a mobile electronic device is found in co-pending U.S. patent application Ser. No. 13/246,813, filed on Sep. 27, 2011, which is incorporated herein by reference.

Once the factory data for the device is finalized, a sealing server 320 that is coupled to the factory data service seals the factory data. In one embodiment, at least one sealing server is present in the assembly factory 300, and couples with the factory data service via the provided manufacturing server 302. The sealing server is responsible for verifying that all of the required factory data has been provided to the assembled electronic device and that the provided data is the correct data for the modules installed within the electronic device. In particular, the sealing server verifies that the calibration data for a particular module has not been recalled or invalidated by the module integrator or the device designer after the data was initially provided to the factory data service at the module integration stage. In one embodiment, the shipping settings station 318 initiates the sealing process after the installation of the production operating system to the electronic device. In one embodiment, the electronic device initiates the sealing process by contacting the sealing server 320 to request the sealing of the factory data as part of the operating system initialization process.

Initial Factory Data Sealing Request

Figure 4:
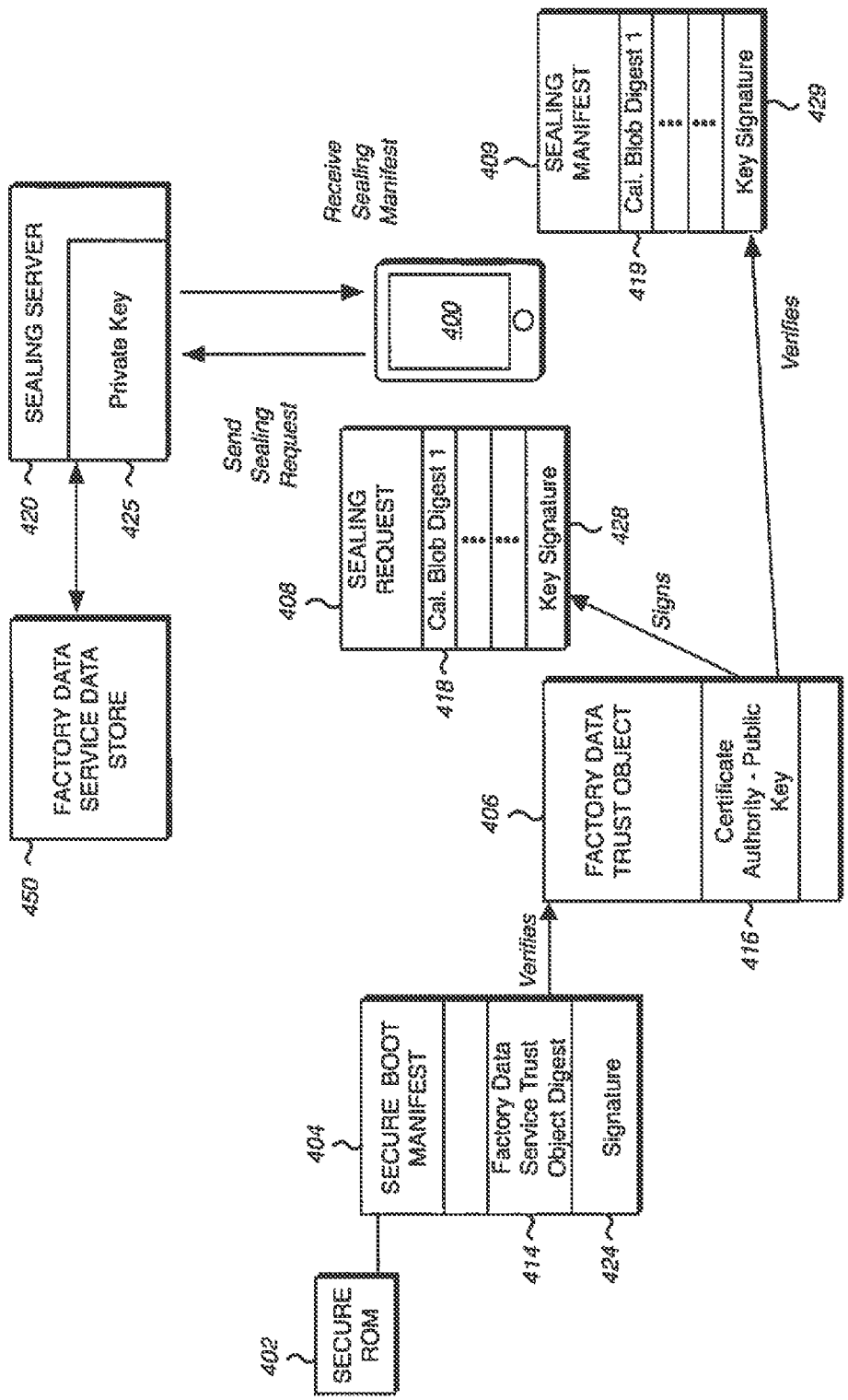
FIG. 4 shows a block diagram illustrating one embodiment of an electronic device secure boot process in which the electronic device requests that the factory data service seal the factory data installed on the electronic device.

FIG. 4 shows a block diagram illustrating one embodiment of an electronic device secure boot process in which the electronic device requests that the factory data service seal the factory data installed on the electronic device. The secure boot process is designed to ensure critical resources within a device 400 will be protected during system operation. Instructions and data are stored inside a secure storage area such as a secure ROM (Read Only Memory) 402. The secure ROM is associated with a device UID (Unique Identifier), which uniquely identifies the device 400 and can be used to derive a public and private key-pair that is used to sign trusted software that executes on the device. The secure ROM can also be associated with a GID (Global Identifier) that is common to all devices in the device family (e.g., all devices sharing the same SOC design). In one embodiment, the GID may be used to encrypt data or instructions to prevent inspection. In embodiment, the factory data for a device family is encrypted using the GID. The boot logic executing on the device application processor has access to a secure boot manifest 404 that is located in the secure ROM 402. The secure boot manifest has a signature 424 based on a device key that is derived from the UID of the device, which allows the boot logic to verify the authenticity of the secure boot manifest 404.

The secure boot manifest 404 contains a factory data service trust object digest 414, which is used to verify the factory data service trust object 406. The trust object 406 is a container that includes the factory data service root CA certificate, an SSL certificate used for encrypted communication with the factory data service, and list revoked certificates issued by the factory data service root CA, or a child CA that is trust chained to the root CA. In one embodiment, the trust object 406 contains only public keys and certificates and can be stored on a standard web server, to allow the device 400 to retrieve updated versions of the trust object 406 during a firmware restore or update.

During an initial secure boot of the device 400, the factory data of the device 400 may not be sealed, as a factory operating system may not require sealed calibration data. Once the device 400 leaves the factory, the calibration data stored on the device becomes vulnerable to tampering. Accordingly, the production version of the operation system of the device 400 may require that the factory data be sealed by the factory data service before the data is accepted. An embodiment of the device 400 can request the sealing of the factory data by generating a sealing request 408 that contains the digest of each calibration blob (e.g., digest 418) stored on the device. The device 400 can then use the public key 416 contained in the factory data service trust object 406 to create a key signature 428. The device 400 can then send a message to a sealing server 420 containing the sealing request 408. If the device is in the factory, the sealing server 420 is a variant of the sealing server 320 of FIG. 3. In one embodiment, the message includes the device UID and GID, and the device signs the message to the sealing server using a device private key.

The sealing server 420 receives the message from the device 400 and, in one embodiment, determines that the message originated at an authorized device of the manufacturer by verifying the signature of the message. The signature can be verified using a device public key, which is derived deterministically from the UID of the requesting device. In one embodiment, before a device is able to send a sealing request, the device 400 is authenticated with the sealing server 420 using a challenge response system utilizing a server nonce and client generated nonce combined and signed with device key. Once the device is authorized to communicate with the sealing server 420, or the message is otherwise determined to be from an authentic device of the manufacturer, the sealing server unpacks the message and verifies the trust object key signature 428 attached to the sealing request by the device 400.

In one embodiment, the scaling server 420 has access to the factory data service data store 450, which can be a variant or mirror of the factory data service data store 150 of FIG. 1A. The sealing server 420 can verify the sealing request 408 by retrieving the set of calibration data that the factory data service indicates as belonging to the device 400. A digest for each blob of calibration data is computed or referenced by the sealing server 420, and if the digests of the factory data blobs of the sealing request match the digests of the calibration data stored by the factory data service, the sealing server can provide a sealing manifest 409 to the device 400. The sealing manifest 409 includes the digest of each blob of factory calibration and provisioning data assigned to the device, and is signed by the factory data service to attest to the authenticity of the manifest. In one embodiment, the sealing manifest 409 is DER encoded data object containing the test station manifest (e.g., test station manifest 204 of FIG. 2) of each factory data object assigned to the device, and signed using a highly secure private key of the provider of the factory data service. The device 400 can then verify the authenticity of the sealing manifest 409 using the signature and an additionally attached certificate that is chained from the root CA associated with the factory data service. In one embodiment, the sealing manifest 409 is signed with a key provided by a hardware security module (HSM) coupled to the sealing server. The HSM can provide cryptographic acceleration to the sealing server, to allow the use of cryptographic key lengths that would otherwise be impractical.

In one embodiment, the sealing server 420 generates the sealing manifest 409 by removing the signatures attached to the sealing request 408 and each calibration blob digest and applying a new signature using a private key 425 of the sealing server, which can be a key provided by the device manufacture, device designer, or the entity providing the factory data service. For example, the calibration blob digest 418 provided in the sealing request is stripped of its pre-sealing signatures and signed with the private key 425 to create the calibration blob digest 419. The key signature 429 of the scaling manifest 409 replaces the key signature 428 in the initial sealing request 408. The device 400 can then validate the received sealing manifest 409 by verifying the key signature 429 that has been applied to the manifest using the public key 416 of the trust object 406. Additional detail regarding the verification of the factory data during the boot process and the sealing and re-sealing of the factory data is provided in FIG. 6 and FIG. 7 below.

Factory Data Update and Recovery System

Figure 5:
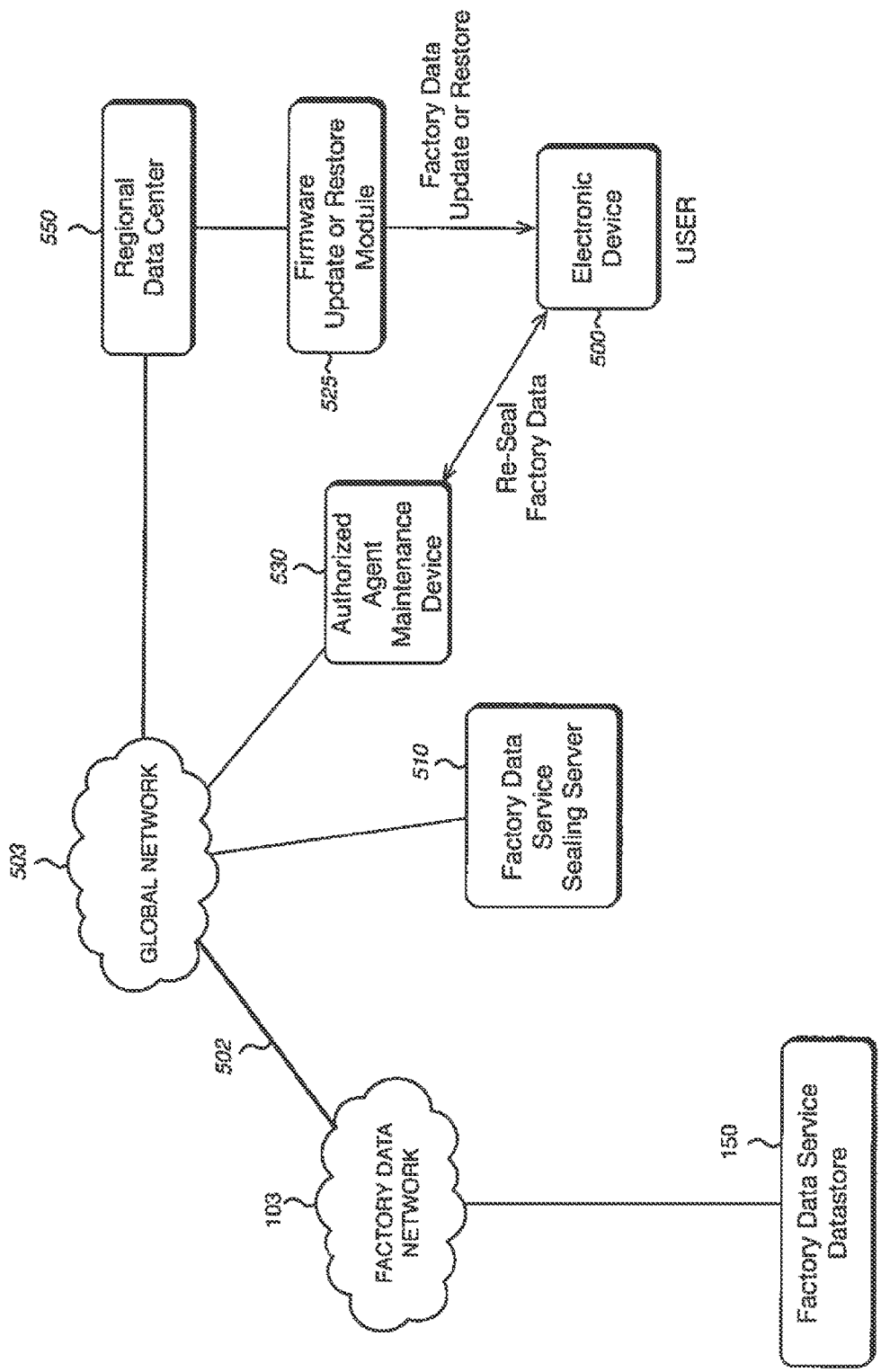
FIG. 5 shows an illustration of an embodiment of the factory data system that is configured to provide updated factory data to an electronic device in a post-factory environment.

FIG. 5 shows an illustration of an embodiment of the factory data system that is configured to provide updated factory data to an electronic device in a post-factory environment. The illustrated post-factory environment is to provide services to an electronic device 500 once it has shipped from the factory environment. The illustrated electronic device 500 can be a variant of the electronic device 400 of FIG. 4, which is assembled in an assembly factory 300 of FIG. 3, using modules from the module integration factory 100 of FIG. 1A.

An embodiment of the factory data service system including the factory data service data store 150 and the factory data network 103 of FIG. 1B is shown. The factory data network 103 can couple with a global network 503, (e.g., Internet or Intranet) over a secure, high bandwidth link 502. Within each region of the global network 503, a regional data center 550, an authorized agent device 530, and a factory data service sealing server 510 can couple with the global network 503. The regional data center 550 contains a mirror of the factory data service data store 150. The regional data center 550 can also contain firmware images, firmware updates, and other information to facilitate a firmware update or restore module 525 to provide periodic firmware updates or firmware restores to the electronic device 500. The authorized agent device 530 is a data processing system residing at an authorized agent, such as an authorized repair or support agent of the device designer or manufacturer, that is authorized to request the factory data service sealing server 510 to re-seal the factory data of the electronic device 500.

The periodic updates facilitated by the firmware update or restore module 525 can include updated factory data, such as updated calibration or provisioning data for one or more modules of the electronic device 500. The firmware update or restore module 525 can wirelessly couple to the electronic device 500, to facilitate over the air firmware updates, or can couple to the electronic device via a wired connection. For example, the iTunese® application program provided by Apple Inc. of Cupertino, Calif. provides a firmware update or restore module 525. During a firmware update, any factory data that is stored on the electronic device 500 is read into memory, which can be a secure memory portion that is encrypted or obfuscated to prevent external analysis. The primary storage device can be erased or formatted, and new version of the firmware, or a current version of the firmware in the case of a firmware restore, can be installed to the primary storage device. The factory data can then be restored to the primary storage device. Validation of the factory data can be performed prior to a firmware restore. Factory data validation is described in FIG. 6 below.

In one embodiment, the factory data service additionally includes a migration service (not shown) that selectively updates the regional data center 550 with updated factory data for the devices operating within the region served by the data center. The migration service allows the electronic device to receive updates for factory data if new data is received. For example, if a module test station (e.g., module test station 106 of FIG. 1) is determined to have produced defective calibration data for a period of time, the set of modules calibrated during the defective period can be referenced, and new calibration data can be generated, for example, by generated new calibration data based on modules with similar output characteristics, or applying a transform to the existing calibration data to adjust for the test station defect. The updated calibration data can be migrated to the relevant regional data center 550. In one embodiment, updated calibration data can also be generated to improve the performance of one or more modules. This improved calibration data can also be migrated to the appropriate regional data center 550 to provide to the electronic device during a firmware update or restore.

In one embodiment, only the manufacturer or a designated agent can update factory data associated with a device, for example when new calibration or provisioning data is available. In one embodiment, an authorized agent of the manufacturer can cause an update of the factory data after servicing the electronic device 500, and authorize the sealing server 510 to re-seal the factory data. The authorized agent can couple the electronic device 500 with a maintenance device 530 of the authorized agent, which can be a specialized device, or a general-purpose data processing system using custom software and utilities. The agent can then provide authentication credentials to the maintenance device 530, which can be a password or authentication token, and the maintenance device will supply the credentials to the electronic device. The electronic device 500 uses the credentials received from the maintenance device 530 to request the factory data service sealing server 510 to re-seal the new set of factory data for the device. To have the updated set of factory data signed, including the data for the replacement module, the device will stitch the new factory data objects retrieved for the replaced modules into the sealing manifest, and send the stitched manifest to the sealing server 510 over the global network 503. Additional details on the logic flow of the factory data validation and re-sealing process are provided in FIG. 6 and FIG. 7 below.

Exemplary Logic Diagrams for Validation and Re-Sealing

Figure 6:
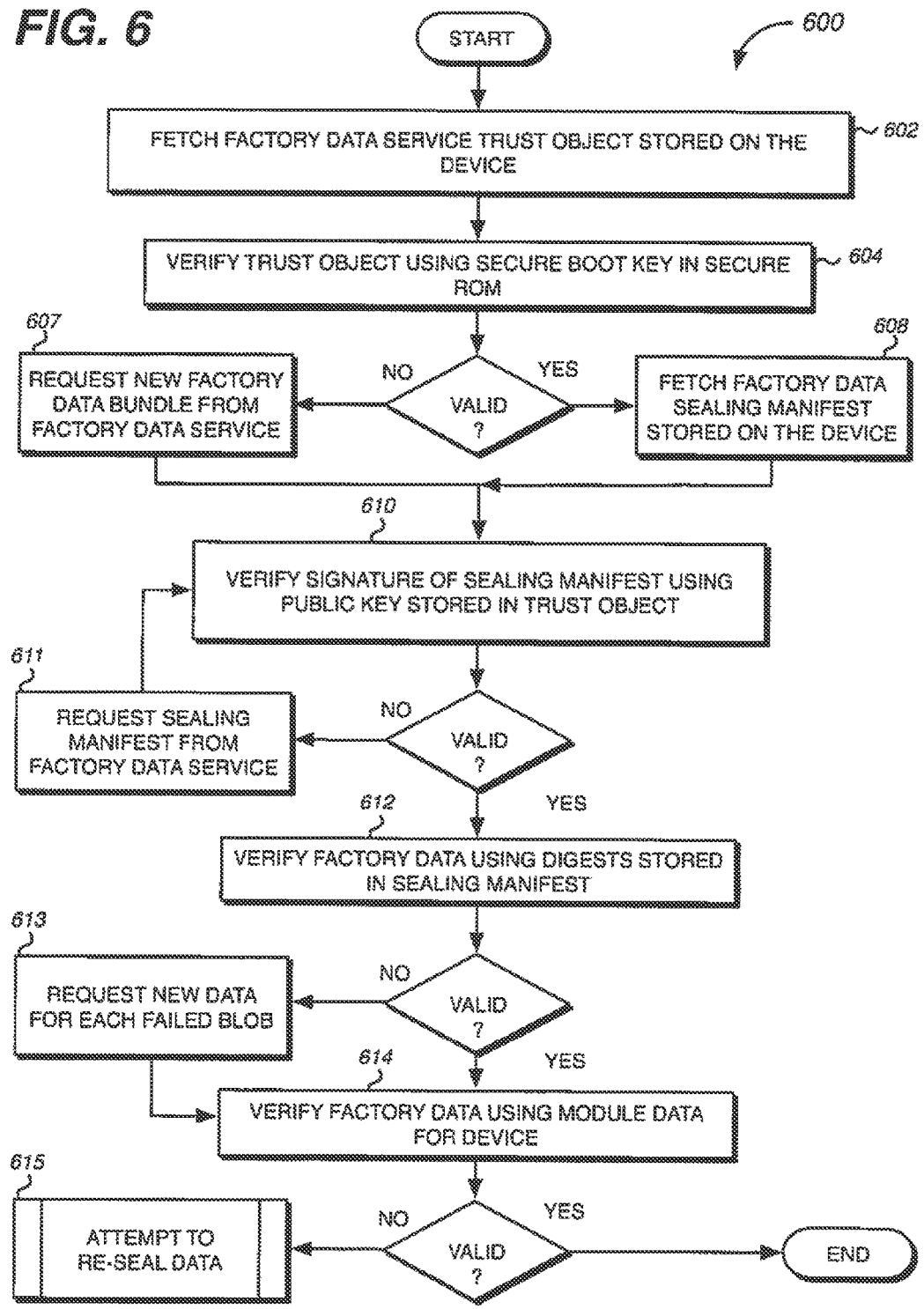
FIG. 6 shows a flow diagram illustrating one embodiment of a method of factory data validation for an electronic device.

FIG. 6 shows a flow diagram illustrating one embodiment of a method of factory data validation for an electronic device. The illustrated factory data validation method 600 begins at Block 602 by fetching a factory data service trust object stored on the device. In one embodiment, the factory data service performs initial factory data validation for an electronic device on a server provided by the factory data service, before the factory data is supplied to an electronic device. In one embodiment, the verification of factory data can be performed during factory device initialization of the electronic device 400 illustrated in FIG. 4. In one embodiment, the electronic device 500 of FIG. 5 performs factory data validation prior to a firmware update or restore. In one embodiment, factory data validation is an element of a secure boot process used during each initialization of the electronic device.

At block 604, an embodiment verifies the trust object digest using the secure boot key stored in the secure ROM. If, at Block 604, the trust object validation fails, the device, at Block 607, will discard or invalidate all resident factory data, including the factory data trust object, and retrieve entirely new factory data from the data service. If, at Block 604, the trust object validation succeeds, the device, at Block 608, fetches the factory data sealing manifest. At Block 610 the device verifies the signature of the sealing manifest stored on the device using the trust object. If the sealing manifest is does not validate, the device, at Block 611, can request a new sealing manifest from the factory data service. In one embodiment, a newly initialized device may not possess a factory data service sealing manifest. If no sealing manifest is present, the device can proceed from Block 608 to Block 611, to request the sealing manifest from the factory data service. In one embodiment, a sealing manifest retrieved from the factory data service is verified, at Block 610, using the trust object, although other embodiments may assume the trust of the sealing manifest if it is retrieved from the factory data service, as in the operation at Block 611, and proceed to Block 612, where the validating electronic device verifies each factory data blob in the sealing manifest.

In one embodiment, each factory data blob is packaged into a factory data object containing a digest computed with a message digest algorithm (e.g., blob digest 236 of factory data service data object 200 shown in FIG. 2). A trust validation is performed, as shown at Block 612, in which the digest of each data object is verified using the set of digests stored in the sealing manifest. If any data object fails to validate, the device can request an update for that individual element of factory data, as shown at Block 613. In one embodiment, new factory data objects retrieved from the factory data service are also validated. At Block 614, the factory data for each module is then verified against the module ID for each associated module. Accordingly, replacing a calibrated component of the electronic device can cause the factory data validation to fail, as the module ID of the replaced module will not match the module ID of the associated factory data object.

If each factory data object passes trust validation at Block 612 and module validation at Block 614, the factory data can be used, and the illustrated embodiment of the factory data validation method 600 ends. In one embodiment, having validated the factory data trust object at Block 604, and the sealing manifest at Block 610, and retrieved new factory data objects for any objects that fail trust validation at Block 613, a failure to validate any of the factory data objects at block 614 results in an attempt to re-seal the factory data, as shown at Block 615. The re-sealing of the factory data is performed by one of the multiple factory data sealing servers provided by embodiments of factory data service. In the factory environment, the re-sealing of factory data can be performed by one of the one or more sealing servers in the factory environment (e.g., sealing server 320 of FIG. 3). The re-sealing of factory data in the factory environment can occur, for example, if a module of the electronic device is found to be defective during factory testing after the device is assembled and the initial factory data is sealed. In one embodiment, the re-sealing of factory data is automatically permitted when the device is in the factory environment. Outside of the factory environment, the resealing of the factory data can be performed, for example, by a regional factory data service sealing server, (e.g., sealing server 510 of FIG. 5). Re-sealing of the factory data is discussed in detail in FIG. 7.

Figure 7:
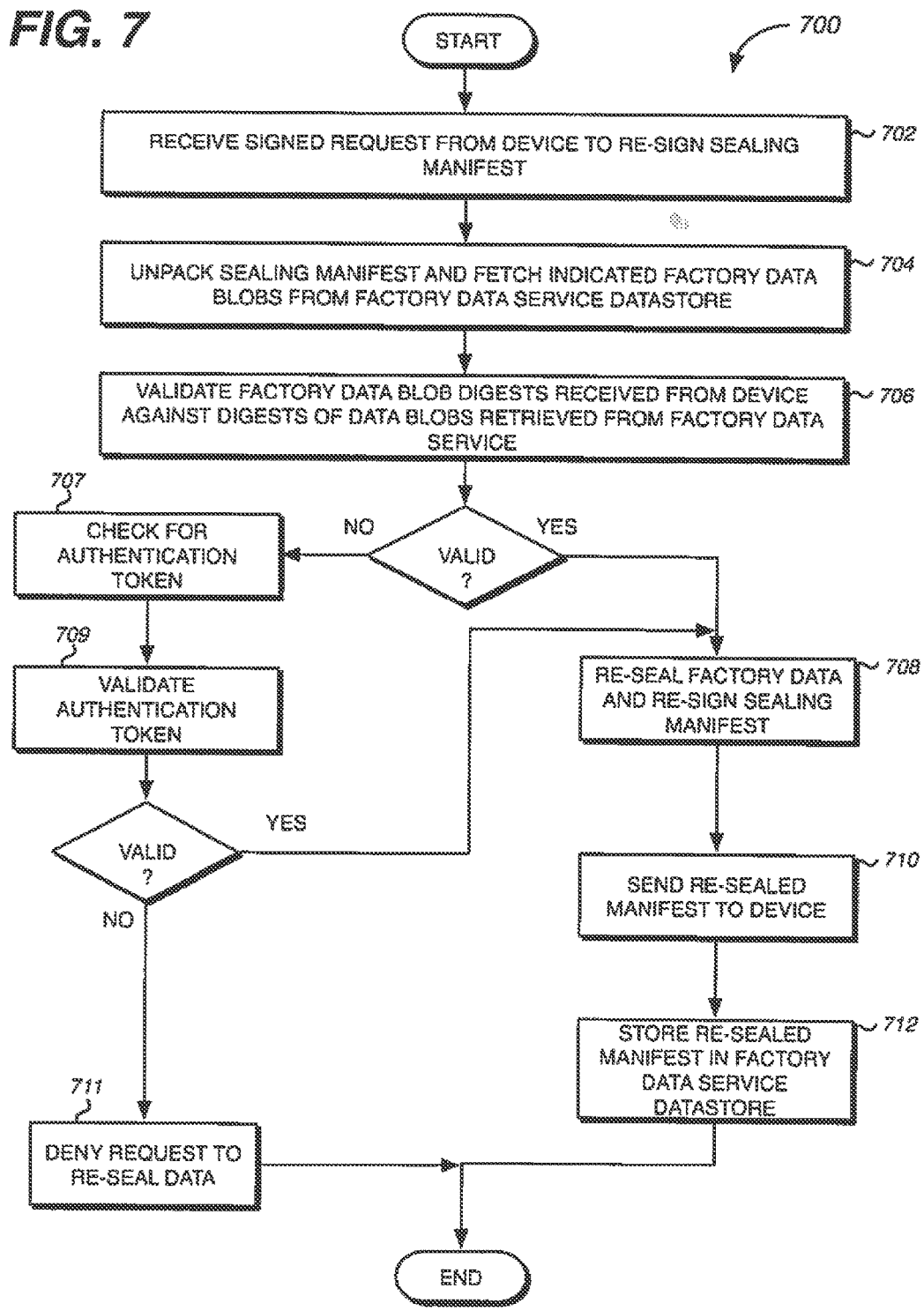
FIG. 7 shows a flow diagram illustrating one embodiment of a method of re-sealing the factory-generated data for an electronic device when the device is outside of the factory environment.

FIG. 7 shows a flow diagram illustrating one embodiment of a method of re-sealing the factory-generated data for an electronic device when the device is outside of the factory environment. The illustrated factory data re-sealing method 700 begins at Block 702, where a sealing server receives a signed request from an electronic device to re-sign the device's sealing manifest. In one embodiment, the request to the sealing server signed with one or more of a device private key associated with the unique device ID, and a symmetric key based on the GID of the device family. In one embodiment, any of the request or response messages exchanged between the device and the sealing server can be encrypted using the device family GID as an encryption key.

In one embodiment, the sealing server has a policy to allow the re-sealing of a sealing manifest that contains updated factory data for one or more modules of a device, but where the module IDs of the device have not changed. To verify the new factory data, the factory data service, at Block 704, unpacks the stitched sealing manifest received from the requesting device and fetches the indicated factory data objects from the factory data service data store. The stitched sealing manifest contains the test station manifest of the data instance (e.g., data instance 246 of FIG. 2) of the updated factory data objects, which allows the sealing manifest to retrieve a copy of the factory data object from the factory data store. As shown at Block 706, the data objects are validated by the sealing server by comparing the digests of the data objects in the sealing manifest with the digests of the data objects retrieved from the data store. If the data objects pass validation, then the factory data service, as shown at Block 708, will re-seal the factory data and re-sign the sealing manifest. In one embodiment, the sealing server re-seals the factory data by using an HSM coupled to the sealing server. The sealing server then sends the re-sealed manifest to the device, as shown at Block 710, and stores the re-sealed manifest in the factory data service data store, as shown at block 712.

As described above, an embodiment of the factory data service will allow a device to automatically request a new scaling manifest for updated factory data if the modules installed in the device have not changed after leaving the factory, which the sealing server can verify at Block 706. In one embodiment, the sealing sever will not authorize a re-sealing of new calibration data for a replaced module in the electronic device unless the re-sealing is requested by an authorized agent. The authentication credentials of the agent can be provided to the device and the device will include the credentials in the request to the sealing server. Thus, in one embodiment if the validation at block 706 fails, the sealing server will check for an authentication token from an authorized agent, as shown at Block 707.

At Block 709, the sealing server can validate the authentication token, to determine whether to seal the new sealing manifest that contains the factory data for the replaced module. If, at Block 709, the sealing server determines that the authentication token is valid, the sealing server proceeds to Block 708, to re-seal the factory data and re-sign the sealing manifest. Alternatively, an embodiment of the factory data service allows the authorized agent to remotely authorize a re-seal for a specific device by providing an authentication token directly to the sealing server. The sealing server can then re-seal the factory data for the device after validating the authentication token at Block 709.

In one embodiment, if at Block 707 the sealing server is not provided an authentication token, or if the authentication token fails validation at Block 709, the sealing server proceeds to Block 711, and will deny the request to re-seal data.

Exemplary Data Processing Systems

Figure 8:
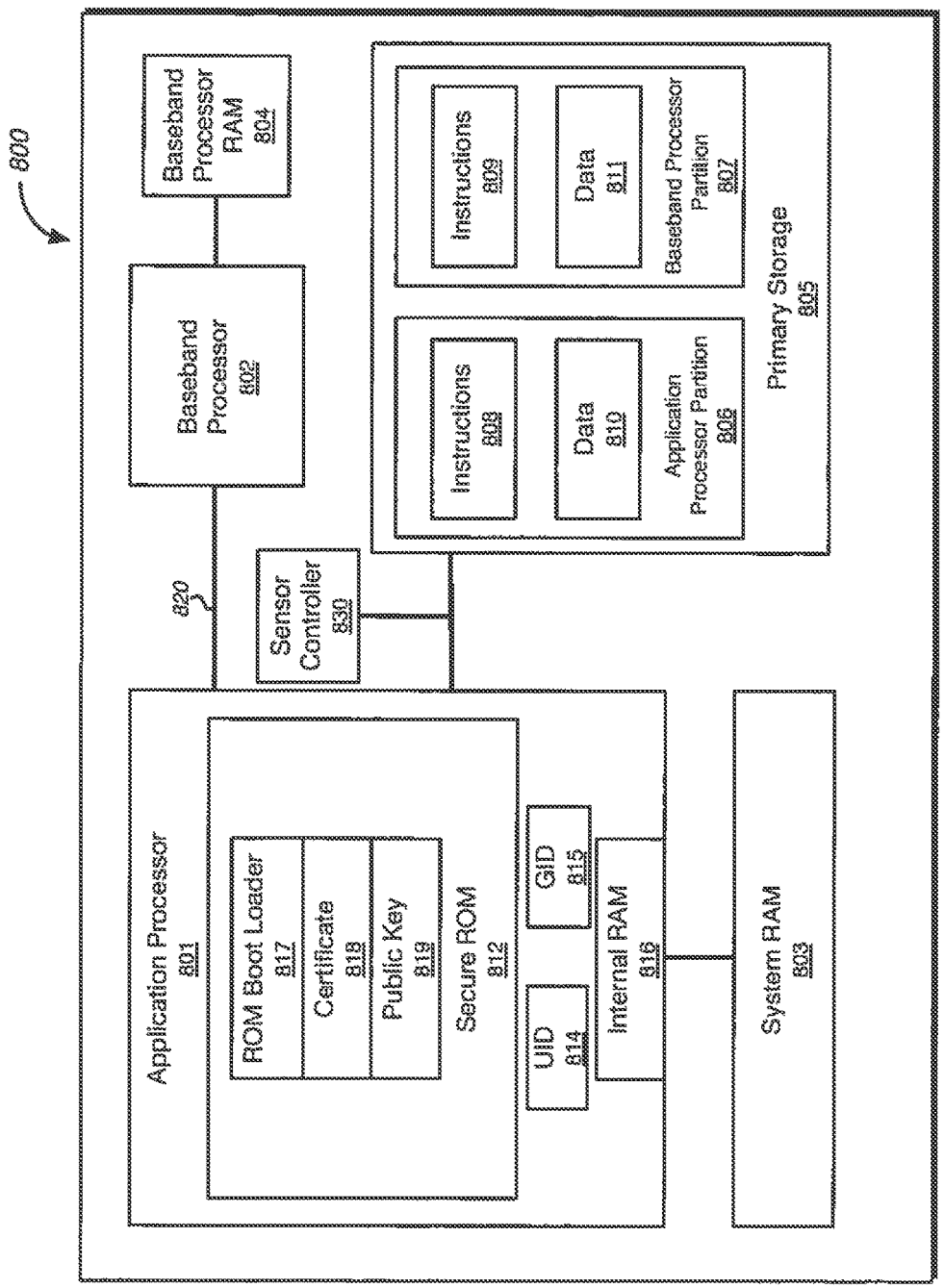
FIG. 8 shows a block diagram illustrating a multifunctional electronic device configured to store and utilize factory-generated data, according to an embodiment.

FIG. 8 shows a block diagram illustrating a multifunctional electronic device configured to store and utilize factory-generated data, according to an embodiment. The illustrated electronic device 800 includes an application processor 801, system RAM 803, a baseband processor 802 with baseband processor RAM 804, and a primary storage device 805. The baseband processor 802 and application processor 801 can communicate over an internal bus 820 that allows the baseband processor 802 to access the primary storage device 895 via the application processor 801. The device 800 can also include a sensor controller 830 to assist the application processor by processing sensor data.

The application processor 801 of the illustrated device 800 includes a secure ROM 812 and internal RAM 816 (e.g., cache memory). The application processor 801 can access encrypted instructions and data stored in primary storage device 805 using a storage key that is based on a UID 814 of the application processor of the device. The illustrated device also includes the GID 815 of the application processor family. The UID 814 and GID 815 can be hard-wired during the manufacturing process of the application processor 801.

In one embodiment, the secure ROM 812 is a variant of the secure ROM 402 of FIG. 4. The secure ROM 812 can include ROM boot loader code 817 that is executed by the processor when entering a power on state. A certificate 818 is present to inspect or certify certain data that has been signed by a proper certificate. In one embodiment, the certificate 818 is a root certificate of an X.509 compatible certificate chain. A public key 819 is a public key of a predetermined public/private key pair, which can be based on the UID 814 of the application processor 801.

The illustrated electronic device 800 further includes a sensor controller 830 to manage sensor functionality for various sensors (e.g., light, touch, proximity, pressure, etc.) included on the device 800. In one embodiment, the sensor controller 830 functions can be performed by logic included within the application processor 801, or executed by a dedicated or shared purpose digital signal processor (not shown) within the electronic device 800. In one embodiment, the sensor controller 830, or an equivalent component, loads specific components of the validated factory data for the device 800 for use in real-time adjustment of sensor data that is based on the factory-generated calibration data. In one embodiment, the baseband processor 802 loads wireless calibration and provisioning data into baseband processor RAM 804 for use in the real-time adjustment of wireless signal data based on the wireless calibration data, and for use in accessing the wireless network for which the baseband processor 802 is configured to access.

The electronic device 800 also includes system available random access memory (RAM) 803 associated with the application processor 801 and baseband processor RAM 804 associated with the baseband processor 802. The system RAM 803 is utilized by application processor 801 to execute any software components associated with the application processor 801, including operating system and file system software, as well as instructions and data (e.g., instruction 808 and data 810) that are loaded into system RAM 803 from primary storage device 805 for use by applications executing on the application processor. Likewise, the baseband processor 802 utilizes baseband processor RAM 804 to load instructions 809 and data 811 that are used in the performance of wireless connectivity functionality. In one embodiment, the baseband processor 802 includes a secure ROM that includes components similar to the secure ROM 812 of the application processor 801.

In the illustrated device 800, the factory-generated calibration and provisioning data is stored on the primary storage device 805 within data partitions; the application processor partition 806 and the baseband processor partition 807. The primary storage device 805 is nonvolatile storage memory, such as flash memory or some other storage medium suitable for maintaining data after power is removed from the device 800. The partitions of the primary storage device 805 contain instructions (e.g., 808, 809) and data (e.g., 810, 811) for use in executing the functionality of the various processors. The device 800 stores sensor calibration data for use by the application processor 801 or sensor controller 830 in a secure portion of the data 810 section of the application processor partition 806. Likewise, the device 800 stores wireless calibration data and provisioning information in a secure portion of the data 811 section of the baseband processor partition 807.

Figure 9:
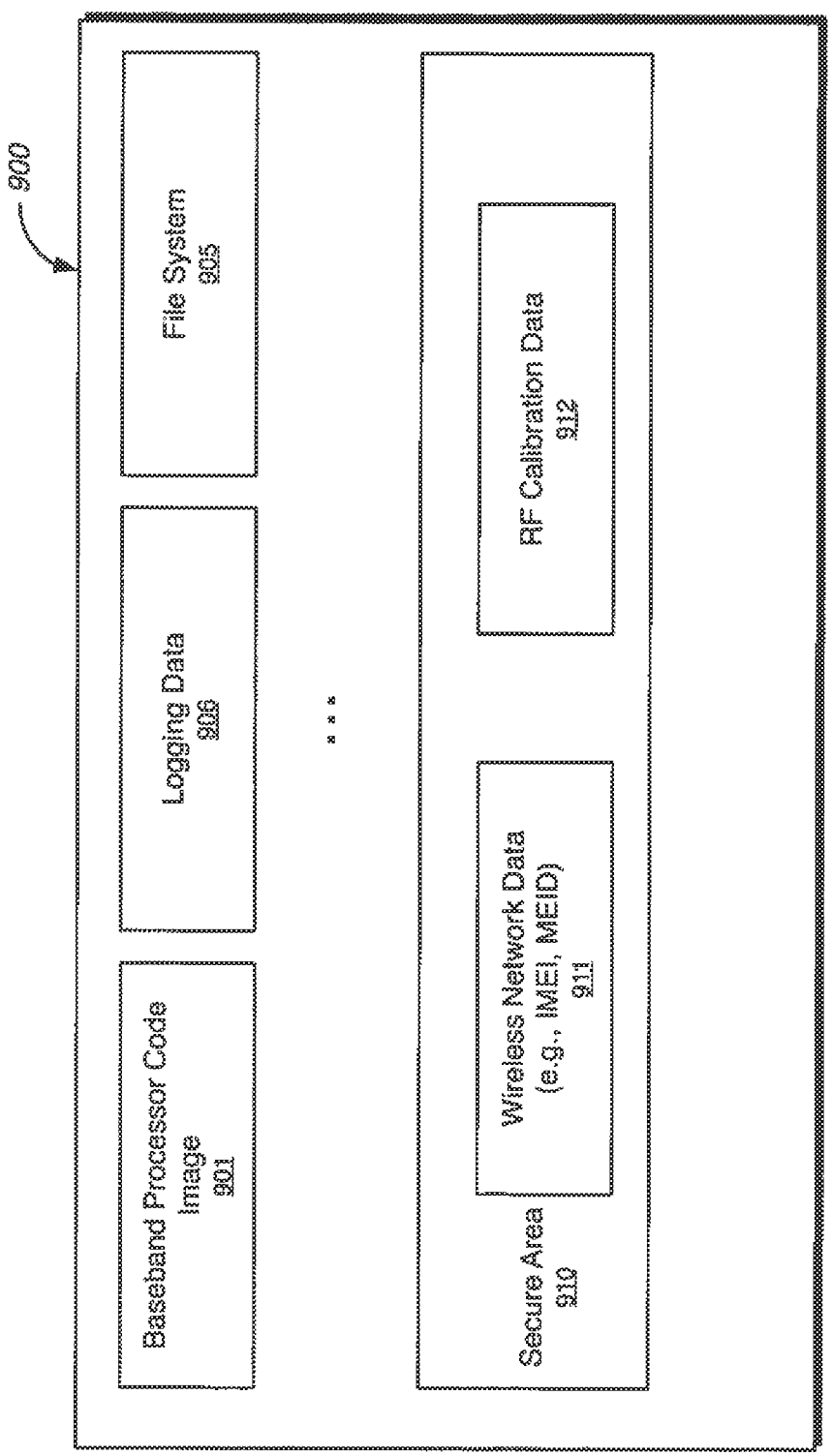
FIG. 9 shows a block diagram illustrating an exemplary baseband processor storage partition containing factory-generated calibration and provisioning data.

FIG. 9 shows a block diagram illustrating an exemplary baseband processor storage partition containing factory-generated calibration and provisioning data. The illustrated baseband processor storage partition 900 represents exemplary storage partition 807 of FIG. 8. The storage partition 900 contains a baseband processor code image 901, logging data 906, and a file system 905 used by the baseband processor operating system. A secure area 910 of storage is used to store baseband processor provisioning data, such as the wireless network data 911, and RF calibration data 912 for the baseband processor. The exemplary application processor 801 illustrated in FIG. 8 has a similar storage partition (e.g., storage partition 806) containing factory-generated calibration data for use by the various calibrated modules managed by the application processor 801 or the sensor controller 830.

Figure 10:
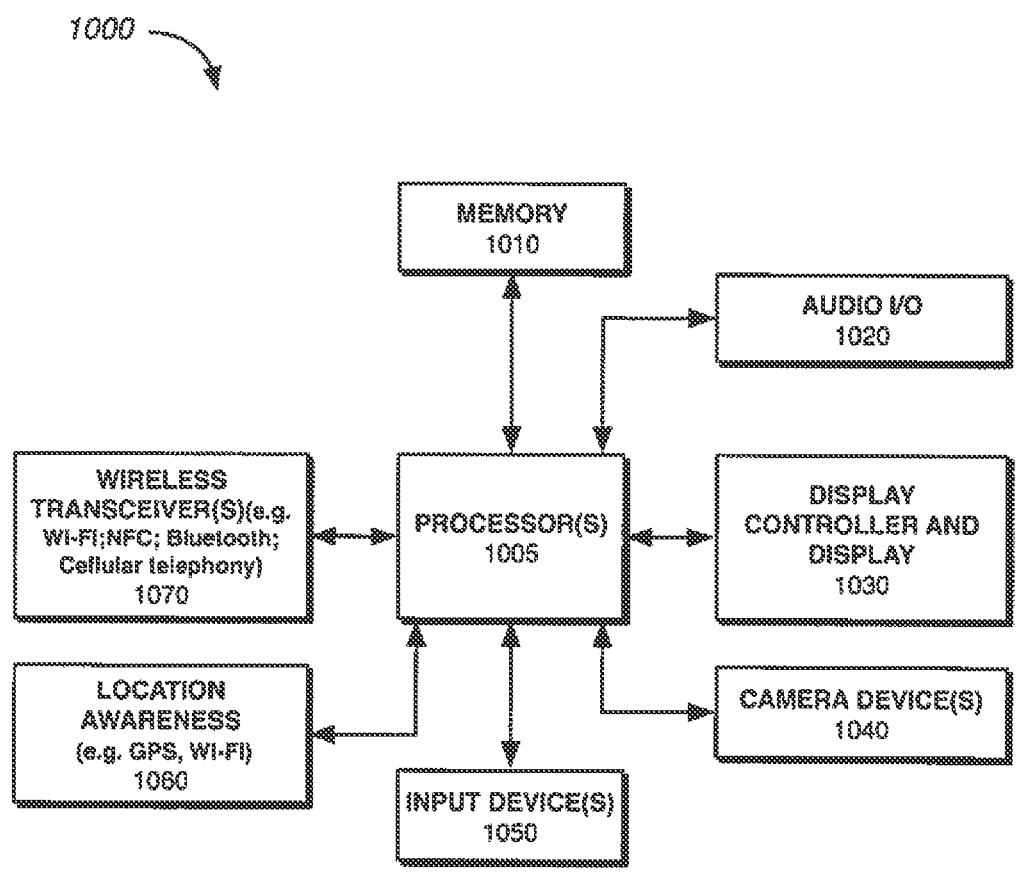
FIG. 10 shows a block diagram illustrating a data processing system that can be used within a mobile electronic device, according to an embodiment.

FIG. 10 shows a block diagram illustrating a data processing system that can be used within a mobile electronic device, according to an embodiment. The data processing system 1000 includes a processing system 1005 with one or more microprocessors. The system 1000 also includes memory 1010 for storing data and programs for execution by the processing system. The system 1000 additionally includes an audio input/output subsystem 1020 that may include a microphone and a speaker for playing back music or providing telephone functionality through the speaker and microphone.

A display controller and display device 1030 can be used to provide a graphical user interface for the user as discussed herein. Additionally, a wireless transceiver 1070 may be available to transmit and receive data via one or more wireless technologies, such as Wi-Fi, infrared, Bluetooth, or one or more variants of wireless cellular technology. The system 1000 can contain one or more camera devices 1040 configured in both a front and rear facing configuration, though similarly configured systems each with a front facing camera can be one of many optimal configurations. The data processing system 1000 can also include one or more input devices 1050 that allow a user to provide input to the system.

Input devices can include a keypad or keyboard, alone or in conjunction with a touch or multi touch panel that is overlaid on the display device 1030. The display device and touch panel can be adjusted in real time using factory-generated calibration data described herein. The data processing system 1000 can also include a device for providing location awareness services, such as a Global Positioning System (GPS) device 1060 or its equivalent, which can also be adjusted using factory-generated calibration data that is generated by the module integrator for those components.

The data processing system 1090 as represented in FIG. 10 is presented as an example. One or more buses or interfaces that are not shown can be used to interconnect the various components, as known in the art, and electronic devices constructed using the illustrated data processing system 1090 may include additional or fewer components than shown.

Figure 11:
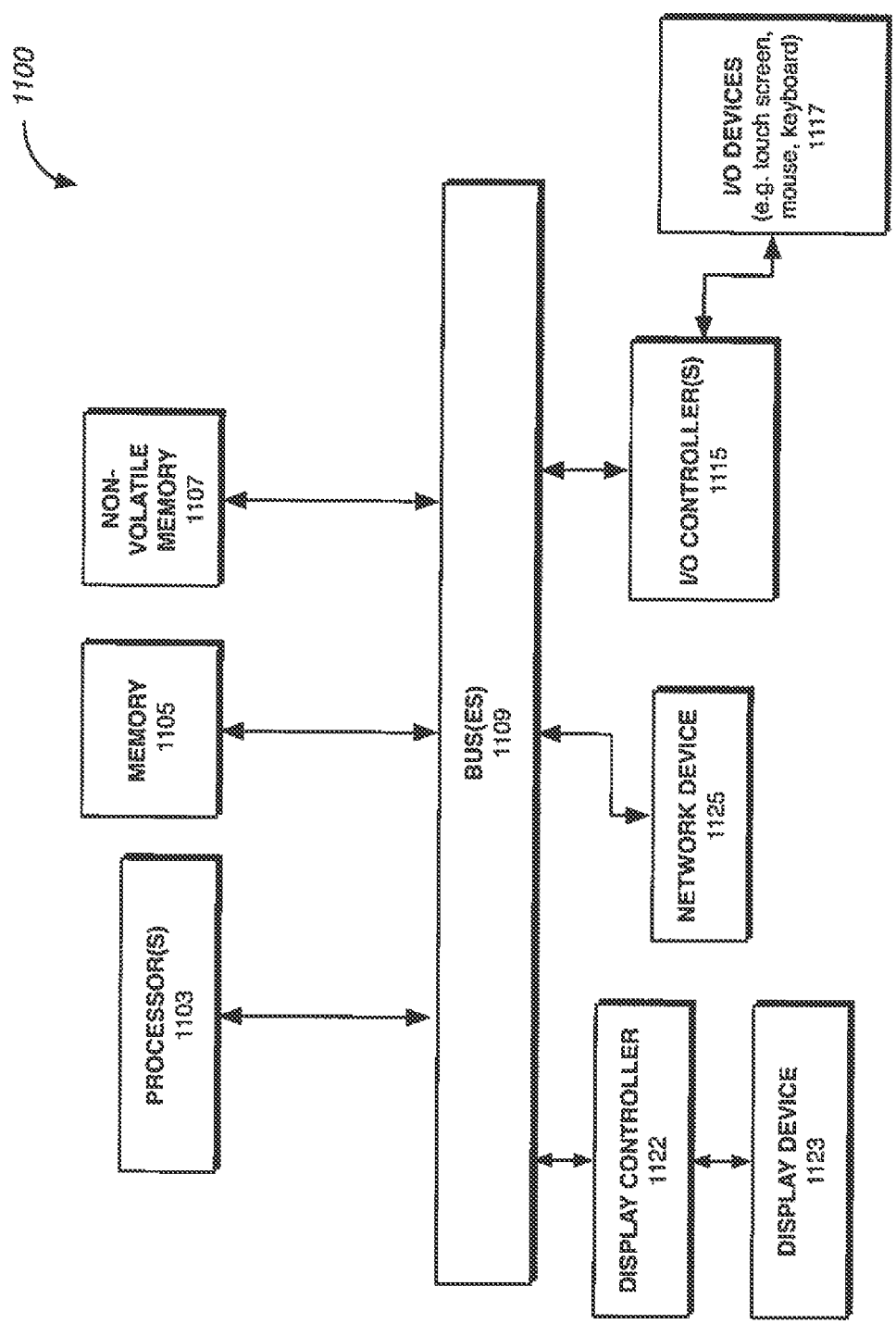
FIG. 11 shows a block diagram illustrating an exemplary data processing system that can be used within a server, workstation, or test station interface, according to an embodiment.

FIG. 11 shows a block diagram illustrating an exemplary data processing system that can be used within a server, workstation, or test station interface, according to an embodiment. FIG. 11 illustrates the various components of a data processing system, but is not intended to represent any particular architecture or manner of interconnecting the components as such details are not germane to the embodiments described. The data processing system 1100 includes one or more buses 1109, which serve to interconnect the various components of the system. One or more processors 1103, each containing one or more processor cores, are coupled to the one or more buses 1109 as is known in the art. Memory 1105 may be volatile Sequential DRAM, nonvolatile RAM or may be flash memory or other types of semiconductor memory. The memory 1105 is coupled to the one or more buses 1109 using techniques known in the art.

The data processing system 1100 can also include nonvolatile memory 1107 for data storage, which may be a hard disk drive, flash memory, optical memory, other types of memory systems that maintain data after all power is removed from the system. The nonvolatile memory 1107 and the memory 1105 can both couple to the one or more buses 1109 using known interfaces and connection techniques. A display controller 1122 is coupled to the one or more buses 1109 in order to receive display data to be displayed on a display device 1123 which can display any one of the user interface features or embodiments described herein. The display device 1123 can include an integrated touch input to provide a touch screen. The data processing system 1100 can also include one or more input/output (I/O) controllers 1115, which provide interfaces for one or more I/O devices such as one or more mice, touch screens, touch pads, joysticks, and other input devices including those known in the art. The I/O controller can also provide interfaces for one or more output devices (e.g., speakers). The input/output devices 1117 are coupled through one or more I/O controllers 1115 as is known in the art. Additionally, one or more network interfaces 1125 can also be coupled to the one or more buses to provide access to one or more networks.

While FIG. 11 shows that the nonvolatile memory 1107 and the memory 1105 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 1109 may include one or more bridges or controllers or adapters to interconnect between various buses. In one embodiment, the I/O controller 1115 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 1105 or the nonvolatile memory 1107 or a combination of such memories. In various embodiments, hardwired circuitry may be used in combination with software instructions, thus the techniques are not limited to any specific combination of hardware circuitry and software or to any particular source for the instructions executed by the data processing system.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus the techniques are not limited to any specific combination of hardware circuitry and software, or to any particular source for the instructions executed by the data processing system associated an apparatus for performing one or more of the operations described herein.

The specification and drawings are to be regarded in an illustrative rather than a restrictive sense. It will be evident that various modifications and changes can be made thereto, and it will be apparent to those skilled in the art that many further modifications and adaptations can be made without departing from the spirit of the concepts set forth herein, in which, in various embodiments, methods, devices and systems for securely generating, sealing, and restoring factory-generated calibration and provisioning data for an electronic device are described, in which calibration and provisioning data for an electronic device are generated in a distributed manner and stored on a storage system, such as a distributed storage network, a centralized storage system, or some other storage system provided by the factory data service. The calibration data can be retrieved from the storage system during device assembly and finalized calibration and provisioning data for each electronic device can be stored to the distributed network.

In one embodiment, a sealing server attests to the authenticity of the factory-generated data by sealing the finalized calibration data using a highly secure key generated by a hardware security module coupled with the sealing server. The attestation can be performed in response to a request to cryptographically sign a set of factory-generated data associated with the electronic device. The request can include a list of factory data objects, where each factory data object is associated with a module of the electronic device. The request can originate at the electronic device, or from some other device responsible for sealing the factory-generated data. Each factory data object in the request can be associated with a module of the electronic device via a unique module identifier. The data object can be identified via a data instance value that is unique to the data object. The data object can also include an object digest that is computed using a message digest algorithm. The message digest can be used to cryptographically authenticate the data object.

The various data objects residing on an electronic device can be verified via a cryptographic trust mechanism, and also correlated with the specific modules assigned to the electronic device at the factory stage. Electronic devices having modules that differ from the modules included in the device in the factory may not pass module authentication due to the module mismatch, and may require the intervention of an authorized agent, such as an authorized repair agent. Accordingly, an embodiment of the sealing server will determine that each element (e.g., each factory data object) in the set of factory data is authentic only in response to receiving and validating an authentication token from an electronic device associated with authorized agent.

In one embodiment, modules that were not registered with the factory data service by the module integrator cannot be used as replacement modules, as data for the modules will not be found by the factory data service. In one embodiment, a set of modules (e.g., known counterfeit or known stolen modules) can be invalidated such that a set of factory data that includes modules in the set of invalidated modules will not be sealed by the factory data service sealing server. Embodiments of the electronic device or sealing server can incorporate validation and sealing logic on non-transitory computer readable medium for execution by the electronic device or sealing server. In one embodiment, an electronic device can access a data store containing the factory-generated data and can update or restore calibration or provisioning data for the device from the data store. However, the scope of the invention is not to be determined or limited by the specific examples provided above but only by the claims below.

What is claimed is:

1. An electronic device comprising:
   one or more sensor modules, each sensor module associated with an identifier unique to each sensor module;
   a secure storage device to store a factory data service trust object; and
   a processor to send a request with the factory data service trust object to a server coupled to storage containing updated factory data associated with the unique identifier for one or more sensor modules and to store updated factory data from the server in the secure storage device if the factory data service trust object is validated based on the request and a signature of a sealing manifest related to the updated factory data is verified using the factory data service trust object.

2. The electronic device of claim 1, wherein the updated factory data includes a production version of updated factory data.

3. The electronic device of claim 1, wherein the production version of updated factory data includes calibration data associated with an identifier unique to one of the sensor modules.

4. The electronic device of claim 1, wherein the updated factory data includes provisioning data for one or more sensor modules.

5. The electronic device of claim 1, wherein the secure storage device is to store a boot key and the server validates the factory data service trust object with the secure boot key stored in the secure storage device.

6. The electronic device of claim 1, wherein the electronic device is determined by the server to be made from an authorized manufacturer using the factory data service trust object and secure boot key.

7. The electronic device of claim 1, wherein an authorized maintenance device provides the updated factory data to the electronic device.

8. A method for an electronic device comprising:
   sending a request to a server coupled to storage containing updated factory data associated with a the unique identifier to one or more sensor modules of the electronic device, wherein the request includes a factory data service trust object; and
   storing the updated factory data from the server related to one or more sensor modules if the server validates the factory data service trust object based on the request and a signature of a sealing manifest related to the updated factory data is verified using the factory data service trust object.

9. The method of claim 8, further comprising storing the updated factory data related to one or more sensor modules of the electronic device in a secured storage device.

10. The method of claim 8, wherein storing the updated factory data includes storing production version of updated factory data related to one or more sensor modules of the electronic device.

11. The method of claim 8, wherein storing the production version of updated factory data includes storing calibration data associated with an identifier unique to one of the sensor modules.

12. The method of claim 8, wherein storing the production version of updated factory data includes storing provisioning data related to one or more sensor modules.

13. The method of claim 8, wherein updating the factory data includes validating the factory data service trust object with a secure boot key stored in the electronic device.

14. The method of claim 13, further comprising determining the electronic device is made from an authorized manufacturer using the factory data service trust object and secure boot key.

15. The method of claim 8, further comprising providing the updated factory data to the electronic device by an authorized maintenance device.

16. A computing device comprising:
   means for sending a request to a server coupled to storage containing updated factory data associated with a unique identifier to one or more sensor modules of the electronic device, wherein the request includes a factory data service trust object; and
   means for storing the updated factory data related to one or more sensor modules if the server validates the fact data service trust object based on the request and a signature of a sealing manifest related to the updated factory data is verified using the factory data service trust object.

17. The computing device of claim 16, further comprising means for storing the updated factory data related to one or more sensor modules of the electronic device in a secured storage environment.

18. The computing device of claim 17, further comprising means for storing production version of updated factory data related to one or more sensor modules of the electronic device.

19. The computing device of claim 18, further comprising means for storing calibration data associated with an identifier unique to one of the sensor modules.

20. The computing device of claim 18, further comprising means for storing provisioning data related to one or more sensor modules.

21. The computing device of claim 16, further comprising means for validating the factory data service trust object with a secure boot key stored in the electronic device.

22. The computing device of claim 21, further comprising means for determining the computing device is made from an authorized manufacturer using the factory data service trust object and secure boot key.

23. The computing device of claim 16, further comprising means for receiving updated factory data from an authorized maintenance device.

24. A non-transitory machine readable medium, including instructions, which if executed by a computing device, causes the computing device to perform a method comprising:
- sending a request to a server coupled to storage contained updated factory data associated with a unique identifier to one or more sensor modules of the computing, wherein the request includes a factory data service trust object; and
- storing the updated factory data from the server related to one or more sensor modules if the server validates the fact data service trust object based on the request and a signature of a sealing manifest related to the updated factory data is verified using the factory data service trust object.

25. The non-transitory machine readable medium of claim 24, including instructions, which if executed by the computing device, causes the computing device to perform a method comprising storing the updated factory data related to one or more sensor modules of the electronic device in a secured memory device.

26. The non-transitory machine readable medium of claim 25, including instructions, which if executed by the computing device, causes the computing device to perform a method comprising storing production version of the updated factory data related to one or more sensor modules of the electronic device.

27. The non-transitory machine readable medium of claim 25, including instructions, which if executed by the computing device, causes the computing device to perform a method comprising storing calibration data included in the updated factory data, the calibration data associated with an identifier unique to one of the sensor modules of the computing device.

28. The non-transitory machine readable medium of claim 25, including instructions, which if executed by the computing device, causes the computing device to perform a method comprising storing provisioning data included in the updated factory data, the provisioning data related to one or more sensor modules of the computing device.

29. The non-transitory machine readable medium of claim 25, including instructions, which if executed by the computing device, causes the computing device to perform a method comprising updating the factory data with updated factory data related to one or more sensor modules if the server validates the factory data service trust object with a secure boot key stored in the computing device.

30. The non-transitory machine readable medium of claim 29, including instructions, which if executed by the computing device, causes the computing device to perform a method comprising determining if the computing device is made from an authorized manufacturer using the factory data service trust object and the secure boot key.

31. The non-transitory machine readable medium of claim 24, including instructions, which if executed by the computing device, causes the computing device to perform a method comprising receiving the updated factory data from an authorized maintenance device.

* * * * *